(12) United States Patent
Han et al.

(10) Patent No.: US 8,360,665 B2
(45) Date of Patent: Jan. 29, 2013

(54) CAMERA SHUTTER DEVICE AND OPTICAL APPARATUS HAVING THE SAME

(75) Inventors: Jinsuk Han, Seoul (KR); Kyoungho Yoo, Seoul (KR); Seungki Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/031,841

(22) Filed: Feb. 22, 2011

(65) Prior Publication Data

US 2011/0206363 A1 Aug. 25, 2011

(30) Foreign Application Priority Data

Feb. 22, 2010 (KR) ........................ 10-2010-0015744

(51) Int. Cl.
*G03B 9/14* (2006.01)

(52) U.S. Cl. .................. 396/463; 310/12.01; 310/12.15; 310/12.24; 310/12.26; 310/12.33; 396/468; 396/469

(58) Field of Classification Search .................... 49/243; 310/12.01, 12.05, 15, 24, 26, 33, 36, 49.22–49.32, 310/216.036, 12.15, 12.24, 12.26, 49.22–49.3; 335/2–3, 229, 269; 399/207; 396/463, 468
See application file for complete search history.

(56) References Cited

U.S. PATENT DOCUMENTS

| | | | | |
|---|---|---|---|---|
| 3,504,320 A * | 3/1970 | Engdahl et al. | ............... | 336/110 |
| 3,533,345 A * | 10/1970 | Starp | ............................. | 396/463 |
| 3,800,249 A * | 3/1974 | Bury | ................................. | 335/2 |
| 3,825,909 A * | 7/1974 | Engstrom et al. | ............... | 365/62 |
| 4,060,313 A * | 11/1977 | Kondo | ............................ | 359/230 |
| 4,088,405 A * | 5/1978 | Pustka et al. | ..................... | 355/71 |
| 4,518,882 A * | 5/1985 | Morino et al. | ................... | 310/15 |
| 4,638,193 A * | 1/1987 | Jones | ............................... | 310/15 |
| 5,101,183 A * | 3/1992 | Dixon | ............................... | 335/3 |
| 5,159,382 A * | 10/1992 | Lee et al. | ....................... | 396/242 |
| 5,325,142 A * | 6/1994 | Depatie et al. | ................ | 396/449 |
| 5,418,588 A * | 5/1995 | Chigira | .......................... | 396/463 |
| 5,489,959 A * | 2/1996 | Akada | ............................ | 396/508 |
| 5,926,664 A * | 7/1999 | Taillie et al. | ................... | 396/463 |
| 6,123,468 A * | 9/2000 | Furlani et al. | ................. | 396/463 |
| 6,670,731 B2 * | 12/2003 | Kotani et al. | ............... | 310/49.24 |
| 6,731,093 B1 * | 5/2004 | Kalmbach | ..................... | 318/696 |
| 7,439,640 B2 * | 10/2008 | Takeuchi | .................... | 310/12.22 |

(Continued)

OTHER PUBLICATIONS

Ruddy et al, Design and Optimization Strategies for Muscle-like Direct Drive Linear Permanent Magnet Motors, BioInstrumentation Laboratory Dept. of Mechanical Engineering, MIT, Jun. 25, 2010.*

(Continued)

*Primary Examiner* — Clayton E LaBalle
*Assistant Examiner* — Kevin Butler
(74) *Attorney, Agent, or Firm* — Saliwanchik, Lloyd & Eisenschenk

(57) ABSTRACT

A camera shutter device and an optical apparatus having the same are disclosed. The camera shutter device includes a pair of cores, each wrapped by a coil and having a distal end facing the other, wherein each coil is formed at the distal end with an electromagnetic force line generating unit. A magnet comprising a first magnet and a second magnet is interposed between the pair of cores. The magnet linearly and reciprocally moves in a direction perpendicular to the electromagnetic force line generating unit, and a slider opens and shuts a shutter blade as the magnet linearly and reciprocally moves, whereby miniaturization and thinning of the shutter device can be realized, and an opening/shutting operation can be stably performed.

18 Claims, 7 Drawing Sheets

U.S. PATENT DOCUMENTS

| | | | | |
|---|---|---|---|---|
| 7,755,245 | B2* | 7/2010 | Prosdocimi | 310/216.023 |
| 7,883,280 | B2* | 2/2011 | Viglione | 396/463 |
| 2002/0135243 | A1* | 9/2002 | Kotani et al. | 310/49 R |
| 2004/0212274 | A1* | 10/2004 | Mizumaki | 310/254 |
| 2005/0218743 | A1* | 10/2005 | Mizumaki | 310/185 |
| 2006/0159446 | A1* | 7/2006 | Nakano | 396/497 |
| 2007/0138898 | A1* | 6/2007 | Prosdocimi | 310/216 |
| 2008/0031617 | A1* | 2/2008 | Toyoguchi et al. | 396/464 |
| 2009/0137294 | A1* | 5/2009 | Chen | 455/575.4 |
| 2009/0218892 | A1* | 9/2009 | Schrader et al. | 310/12.24 |
| 2010/0309369 | A1* | 12/2010 | Jarvis et al. | 348/371 |
| 2011/0038626 | A1* | 2/2011 | Lim et al. | 396/468 |
| 2011/0273789 | A1* | 11/2011 | Knoedgen | 359/824 |

OTHER PUBLICATIONS

Jae_Seok Choi et al., Design of a Halbach Magnet Array Based on Optimization Techniques, IEEE Transactions on Magnetics, vol. 44, No. 10, Oct. 2008.*

* cited by examiner

US 8,360,665 B2

CAMERA SHUTTER DEVICE AND OPTICAL APPARATUS HAVING THE SAME

CROSS-REFERENCE TO RELATED APPLICATION

This application claims the benefit under 35 U.S.C. §119 of Korean Patent Application No. 10-2010-0015744, filed Feb. 22, 2010, which is hereby incorporated by reference in its entirety.

BACKGROUND OF THE DISCLOSURE

1. Field of the Invention

The teachings in accordance with the exemplary embodiments of this disclosure relate generally to a camera shutter device opening and shutting a lens nozzle in an optical imaging device including a camera-embedded mobile device, and an optical apparatus having the same.

2. Background

Recently, as the number of pixels in a camera-embedded mobile device increases, an optical imaging device including the camera-embedded mobile device is becoming diversified and high-graded (e.g., capable of photographing high quality pictures). Therefore, the camera-embedded mobile device is in need of adoption of a shutter configured to open and shut a lens nozzle such as that usually found in a general camera.

If such a shutter is employed in the camera-embedded mobile device, it may be possible to photograph an image of higher quality as compared to a camera-embedded mobile device deprived of a shutter, and a ground can be provided to enable an embedded camera to exhibit a performance of high resolution in a proper manner.

However, due to the fact that a small mobile device is restricted by installation space and battery consumption, miniaturization of the shutter device including a shutter and other elements used for operating the shutter, and reduction of driving power must be taken into consideration as a top priority.

That is, because the conventional shutter device has a disadvantageously large number of elements with a complicated operation structure, a large area of installation space is unnecessarily used, and power transmission loss increases to increase the battery consumption.

Another disadvantage is that a plurality of gears is used in the general camera shutter device and the picture quality of a captured image can be degraded due to a slow response speed of a shutter if a complicated link mechanism is employed. Accordingly, the shutter device should have a high shutter speed capable of instantly opening and shutting light reflected from an object.

BRIEF SUMMARY

An object of the present disclosure is to solve at least one or more of the above disadvantages and/or shortcomings in a whole or in part and to provide at least one of the advantages described hereinafter.

Therefore, the present disclosure provides a camera shutter device capable of being miniaturized, of light weight, and thin.

The present disclosure also provides a camera shutter device capable of allowing shutter blades to stably perform an opening/shutting operation and increasing an opening/shutting speed of the shutter blades.

The present disclosure also provides an optical apparatus configured for compactness by miniaturizing and thinning a camera shutter device therein.

Technical disadvantages and/or shortcomings to be solved by the present disclosure are not restricted to the above-mentioned, and any other technical problems not mentioned so far will be clearly appreciated from the following description by skilled in the art.

In one general aspect of the present disclosure, there is provided a camera shutter device, the device comprising: a pair of cores each wrapped by a coil, each core facing the other and formed at a distal end with an electromagnetic force line generating unit; a magnet interposed between the pair of cores, the magnet linearly and reciprocally moving in a direction perpendicular to the electromagnetic force line generating unit and comprising a first magnet and a second magnet; and a slider for opening and shutting a shutter blade as the magnet linearly and reciprocally moves.

Preferably, the core is mounted with a yoke for inducing and blocking an electromagnetic force line.

Preferably, the yoke takes the shape of a plate for blocking one side of the coil, and is mounted on at least one surface of the core selected from an upper surface, a bottom surface, a left surface and a right surface of the core.

In one embodiment, the camera shutter device includes a core having a first rod on which the core is wrapped by a coil, a first electromagnetic force line generating unit formed at a distal end of the first rod, and a second rod connected to the first rod, arranged in parallel with the first rod and formed at its distal end with a second electromagnetic force line generating unit.

In accordance with certain embodiments, the first and second magnets are so arranged as to have a mutually opposite polarity.

In one embodiment, the first and second magnets are cross-wise arranged across the first and second cores, and are formed with a gap therebetween.

In another embodiment, the first and second magnets are cross-wise arranged across the first and second cores, and are mounted with a non-magnetic material barrier therebetween.

In yet another embodiment, the first and second magnets are cross-wise arranged across the first and second cores, and are area-contacted.

In one embodiment, the first magnet is arranged opposite to the first core, the second magnet is arranged opposite to the second core, and a gap is formed between the first and second magnets.

In another embodiment, the first magnet is arranged opposite to the first core, the second magnet is arranged opposite to the second core, and a non-magnetic material barrier is formed between the first and second magnets.

In yet another embodiment, the first magnet is arranged opposite to the first core, the second magnet is arranged opposite to the second core, and the first and second magnets are area-contacted.

In another general aspect of the present disclosure, there is provided an optical apparatus, the apparatus comprising: a camera including a main body, a display unit arranged at a front surface of the main body for displaying information, and a camera shutter device provided at the main body for capturing an image or a photograph, wherein the camera shutter device includes a pair of cores each wrapped by a coil, each core facing the other and formed at a distal end with an electromagnetic force line generating unit, a magnet interposed between the pair of cores, the magnet linearly and reciprocally moving in a direction perpendicular to the electromagnetic force line generating unit and comprising a first magnet and a second magnet, and a slider for opening and shutting a shutter blade as the magnet linearly and reciprocally moves.

Preferably, the core is mounted with a yoke for inducing and blocking an electromagnetic force line.

Preferably, the yoke takes the shape of a plate for blocking one side of the coil, and is mounted on at least one surface of the core selected from an upper surface, a bottom surface, a left surface and a right surface of the core.

According to an embodiment, the camera shutter device includes a core having a first rod on which the core is wrapped by a coil, a first electromagnetic force line generating unit formed at a distal end of the first rod, and a second rod connected to the first rod, arranged in parallel with the first rod and formed at its distal end with a second electromagnetic force line generating unit.

According to certain embodiments, the first and second magnets are so arranged as to have a mutually opposite polarity.

In one embodiment, the first and second magnets are cross-wise arranged across the first and second cores, and are formed with a gap therebetween.

In another embodiment, the first and second magnets are cross-wise arranged across the first and second cores, and are mounted with a non-magnetic material barrier therebetween or area-contacted.

In yet another embodiment, the first magnet is arranged opposite to the first core, the second magnet is arranged opposite to the second core, and a gap is formed between the first and second magnets or a non-magnetic material barrier is formed between the first and second magnets.

In even yet another embodiment, the first magnet is arranged opposite to the first core, the second magnet is arranged opposite to the second core, and the first and second magnets are area-contacted.

ADVANTAGEOUS EFFECTS

The camera shutter device and optical apparatus having the same according to the present disclosure has an advantageous effect in that miniaturization and thinning of the shutter device can be realized, and an opening/shutting operation can be stably performed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
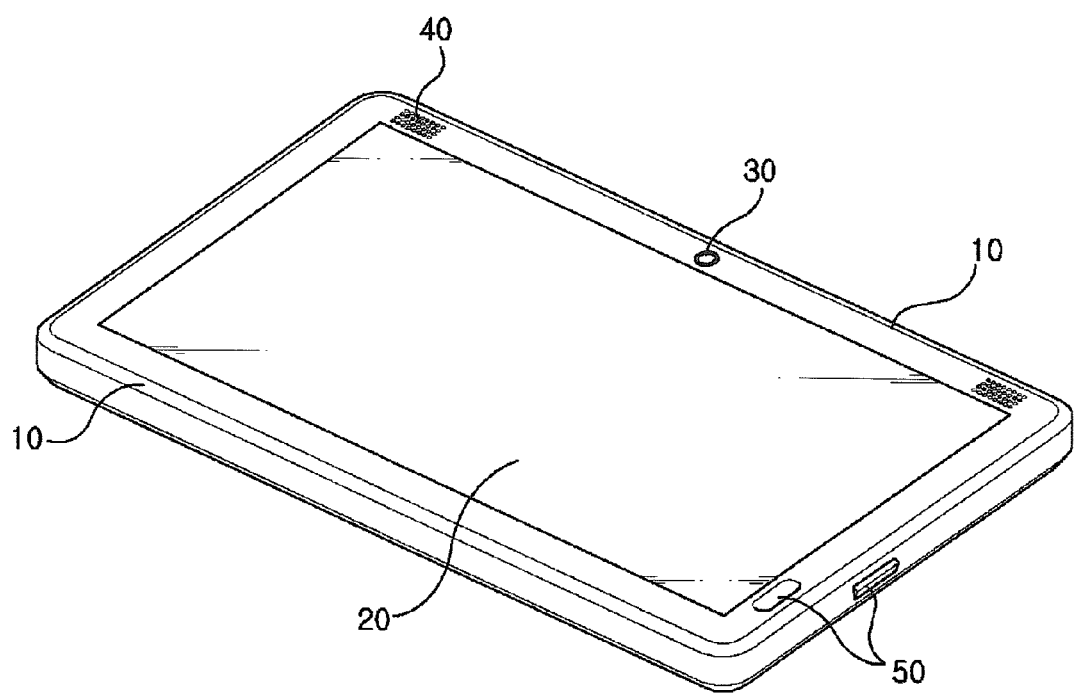
FIG. 1 is a perspective view illustrating an optical apparatus according to an exemplary embodiment of the present disclosure.

The disclosed embodiments and advantages thereof are best understood by referring to FIGS. 1-11 of the drawings, like numerals being used for like and corresponding parts of the various drawings. Other features and advantages of the disclosed embodiments will be or will become apparent to one of ordinary skill in the art upon examination of the following figures and detailed description.

The exemplary embodiments described here in detail for illustrative purposes are subject to many variations in structure and design. It should be emphasized, however, that the present disclosure is not limited to a particular disclosure, as shown and described. It is understood that various omissions and substitutions of equivalents are contemplated as circumstances may suggest or render expedient, but these are intended to cover the application or implementation without departing from the spirit or scope of the claims of the present invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In describing embodiments of the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The limitations in the claims are to be interpreted broadly based the language employed in the claims and not limited to examples described in the present description or during the prosecution of the application, which examples are to be construed as non-exclusive. For example, in the present disclosure, the term "preferably", "preferred" or the like is non-exclusive and means "preferably", but not limited to.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof That is, the terms "including", "includes", "having", "has", "with", or variants thereof are used in the detailed description and/or the claims to denote non-exhaustive inclusion in a manner similar to the term "comprising". Furthermore, "exemplary" is merely meant to mean an example, rather than the best.

FIG. 1 is a perspective view illustrating an optical apparatus according to an exemplary embodiment of the present disclosure.

The optical apparatus according to an exemplary embodiment of the present disclosure includes a main body (10), a display unit (20) arranged at a front surface of the main body (10) for displaying visual information or image information, a camera (30) mounted at one side of the main body (10) to capture an image or a photograph, a speaker (40) for outputting a sound, and an input unit (50) by which a user can input information.

The optical apparatus may be applied to any electronic apparatus mounted with a camera including, but not limited to, a laptop computer, a tablet PC, a mobile phone, a smart phone, a distal broadcasting terminal, a PDA (Personal Digital Assistant), a PMP (Portable Multimedia Player) and a navigation device. In accordance with embodiments of the invention, the camera (30) is mounted with a camera shutter device for opening/shutting a lens nozzle.

Figure 2:
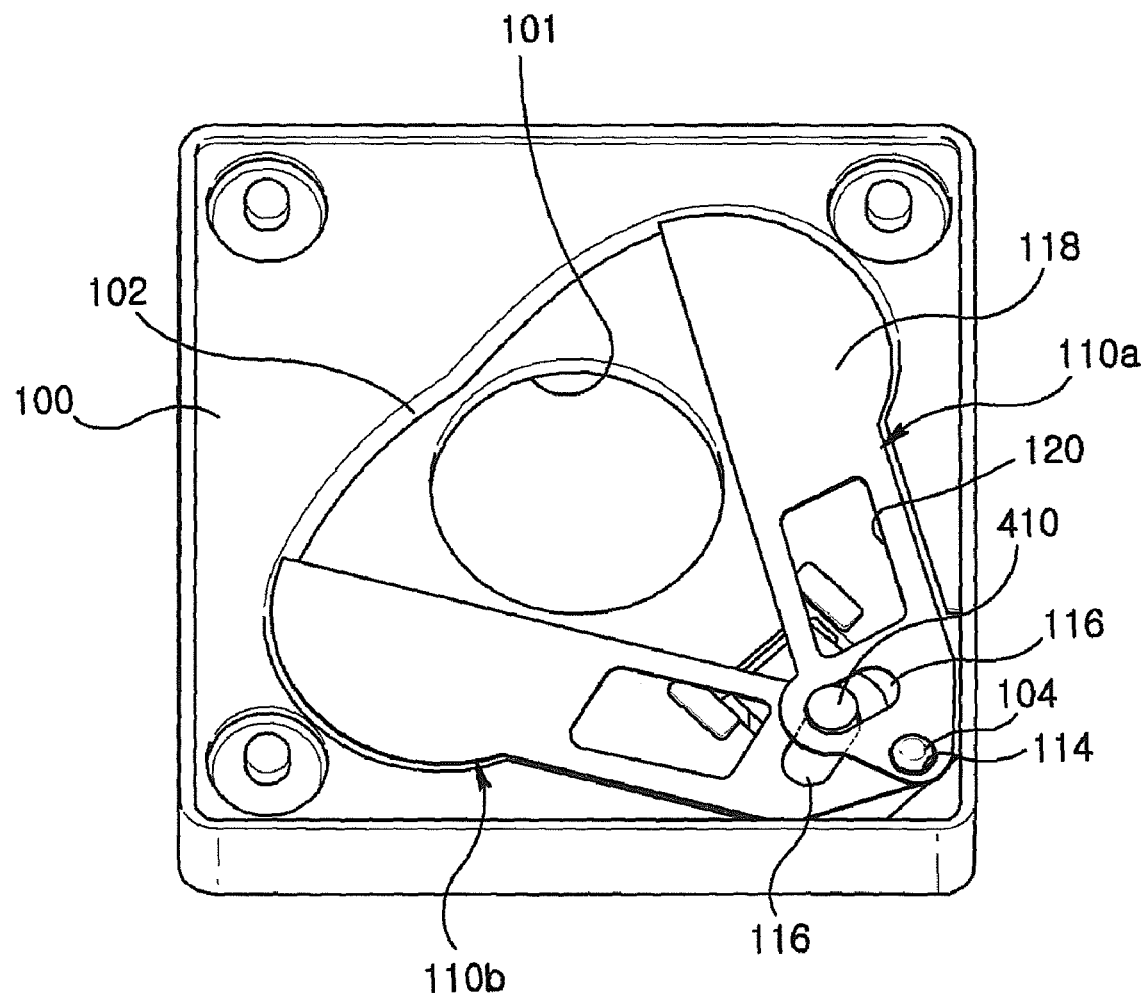
FIG. 2 is a structural view illustrating a camera shutter device according to an exemplary embodiment of the present disclosure.
Figure 3:
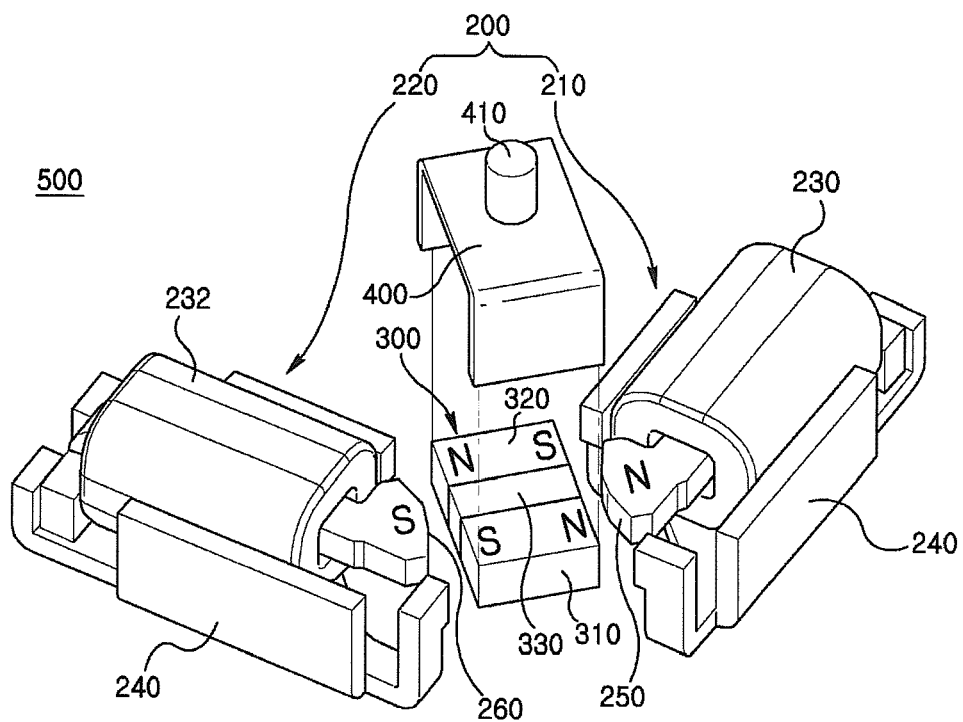
FIG. 3 is a perspective view illustrating a driving unit of a camera shutter device according to an exemplary embodiment of the present disclosure.

FIG. 2 is a structural view illustrating a camera shutter device according to an exemplary embodiment of the present disclosure, and FIG. 3 is a perspective view illustrating a driving unit of a camera shutter device according to an exemplary embodiment of the present disclosure.

Referring to FIGS. 2 and 3, a configuration of a camera shutter device according to the present disclosure will be described in detail.

A shutter device according to an exemplary embodiment of the present disclosure includes a base (100) formed with a light permeation hole (101), a pair of shutter blades (110a, 110b) rotatably formed at the base for opening/shutting the light permeation hole (101), and a driving unit (500) for driving the pair of shutter blades (110a, 110b).

The base (100) is mounted on an optical image device, and can be centrally formed with the light permeation hole (101) and formed with an accommodation unit (102) in which the pair of shutter blades (110a, 110b) is rotatably accommodated. The base (100) is formed at one side thereof with a hinge axis (104) on which the pair of shutter blades (110a, 110b) is hinged in an overlapped state.

The shutter blades (110a, 110b) are formed in a pair to cover (i.e., shut) the light permeation hole (101) by rotating to a mutually-wrapping direction, and to open the light permeation hole (101) by rotating to a mutually-separating direction.

The shutter blades (110a, 110b) are formed at one side thereof with a hinge hole (114) rotatably supported by the hinge axis (104), and are formed at the other side thereof with a semi-circular shutter plate (118) to open/shut the light permeation hole (101). The shutter blades (110a, 110b) are also formed with a slot (116) that rotates the shutter plate (118) when a driving shaft (410) of the driving unit (500) is inserted to linearly and reciprocally move the driving axis (410). The shutter blades (110a, 110b) are further formed with a stopper hole (120) hinged by a stopper formed at the base (100) to restrict a rotation scope.

The slot (116) is formed at a place near the hinge hole (114) to minimize the linear reciprocating stroke of the driving axis (410), whereby the shutter blades (110a, 110b) can quickly perform the opening/shutting operation. Furthermore, the shutter blades (110a, 110b) can minimize the length of the slot (116) due to opening/shutting operation through linear reciprocating operation of the driving axis (410).

Referring to FIG. 3, the driving unit (500) includes a core (200), a coil (230) wrapped on the core (200) to magnetize the core (200) when a power is applied, a magnet (300) arranged in opposition to the core (200) such that the magnet linearly moves when the core (200) is magnetized, and a slider (400) fixed at the magnet (300) and formed with a driving axis (410).

The core (200) is peripherally wrapped by a coil (230) and is formed at a distal end thereof with an electromagnetic force line generating unit (250). The core (200) is formed with a yoke (240) for effectively inducing and blocking an electromagnetic force line generated when the coil (230) is applied with a voltage. The yoke takes the shape of a plate for blocking one side of the coil, and may be mounted on at least one surface of upper surface, a bottom surface, a left surface and a right surface of the core.

By mounting the core (200) with the yoke (240), the electromagnetic force line can be induced and blocked when the voltage is applied to the coil (230), reinforcing an induced electromotive force between the magnet (300) and the core (200).

The core can constitute a core pair about the magnet (300). That is, the core (200) includes a first core (210) at one side of the magnet (300), where the distal end of the first core (210) faces the magnet (300), and a second core (220) at the other side of the magnet (300), where the distal end of the second core (220) faces the magnet (300).

A coil (230) wrapped on the first core (210) and a coil (232) wrapped on the second core (220) are applied with mutually opposite voltages. That is, if a voltage of forward direction is applied to the coil (230) of the first core (210), the coil (232) of the second core (220) is magnetized with a voltage of an opposite direction. Therefore, the first core (210) and the second core (220) are always oppositely magnetized.

For example, if the first core (210) is magnetized with S polarity, the second core (220) is magnetized with N polarity.

The magnet (300) is interposed between an electromagnetic force line generating unit (250) of the first core (210) and an electromagnetic force line generating unit (260) of the second core (220) across a predetermined gap, and linearly and reciprocally moves by maintaining the predetermined gap to a direction perpendicular to the electromagnetic force line generating units (250, 260).

The magnet (300) includes two magnetized magnets each having two poles. That is, the magnet (300) includes a first magnet (310) and a second magnet (320) formed across a gap (330) from the first magnet (310). Two poles of the first and second magnets (310, 320) are cross-wisely and oppositely arranged across the first and second cores, and the first and second magnets (310, 320) are formed with the gap (330) therebetween.

The first magnet (310) is structured in such a manner that a lateral surface facing the first core (210) has a polarity opposite to that of a lateral surface facing the second core (220), and the second magnet (320) has a polarity opposite to that of the first magnet (310). For example, if the lateral surface facing the first core (210) in the first magnet (310) is magnetized with N polarity, the lateral surface facing the first core (210) in the second magnet (320) is magnetized with S polarity.

Figure 4:
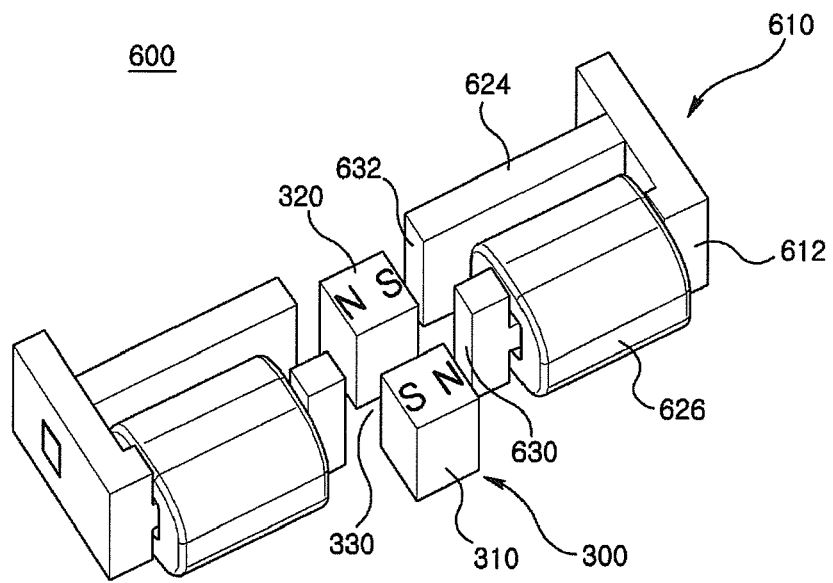
FIG. 4 is a perspective view illustrating a driving unit of a camera shutter device according to a second exemplary embodiment of the present disclosure.

FIG. 4 is a perspective view illustrating a driving unit of a camera shutter device according to a second exemplary embodiment of the present disclosure.

A driving unit (600) according to the second exemplary embodiment of the present disclosure is constructed with a similar configuration as that of the driving unit (500), except that its core (610) is differently structured from the core (200) according to the first exemplary embodiment of the present disclosure.

That is, the core (610) according to the second exemplary embodiment of the present disclosure includes a first rod (612) wrapped by a coil (626), and a second rod (624) connected to the first rod (612) and arranged in parallel with the first rod (612).

Furthermore, a distal end of the first rod (612) is formed with a first electromagnetic force line generating unit (630), and a distal end of the second rod (624) is formed with a second electromagnetic force line generating unit (632). The first electromagnetic force line generating unit (630) and the second electromagnetic force line generating unit (632) have an opposite polarity with respect to each other.

Figure 5:
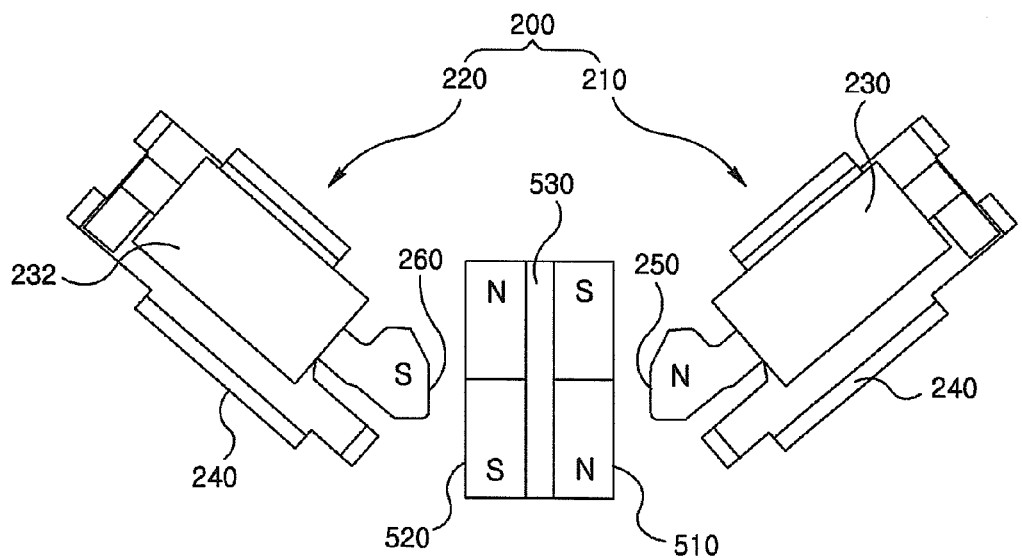
FIG. 5 is a top view illustrating a driving unit of a camera shutter device according to a third exemplary embodiment of the present disclosure.

FIG. 5 is a top view illustrating a driving unit of a camera shutter device according to a third exemplary embodiment of the present disclosure.

The driving unit of a camera shutter device according to a third exemplary embodiment of the present disclosure is configured in such a fashion that a first magnet (510) and a second magnet (520) are length-wise arranged, and a gap (530) is formed between the first magnet (510) and the second magnet (520).

That is, the first magnet (510) faces the distal end of the first core (210), and the second magnet (520) faces the distal end of the second core (220). The first magnet (510) is arranged with an N pole and an S pole toward a direction of linear reciprocating movement, and the polarity of the second magnet (520) is opposite to that of the first magnet (510). The magnet (300) may be magnetized with two poles in various shapes, and the following describes various exemplary embodiments.

Figure 6:
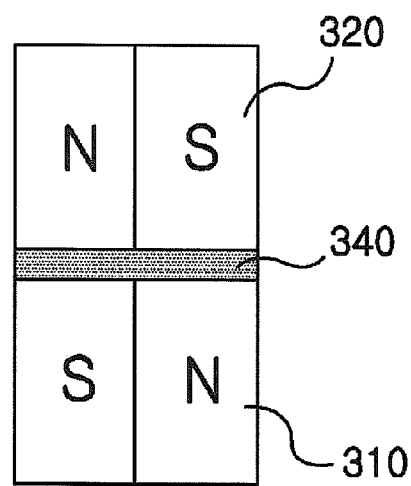
FIGS. 6 through 9 are plan views illustrating various exemplary embodiments of a magnet according to the present disclosure.

Referring to FIG. 6, the first and second magnets (310, 320) may be cross-wise arranged and mounted with a non-magnetic material barrier (340) therebetween.

Figure 7:
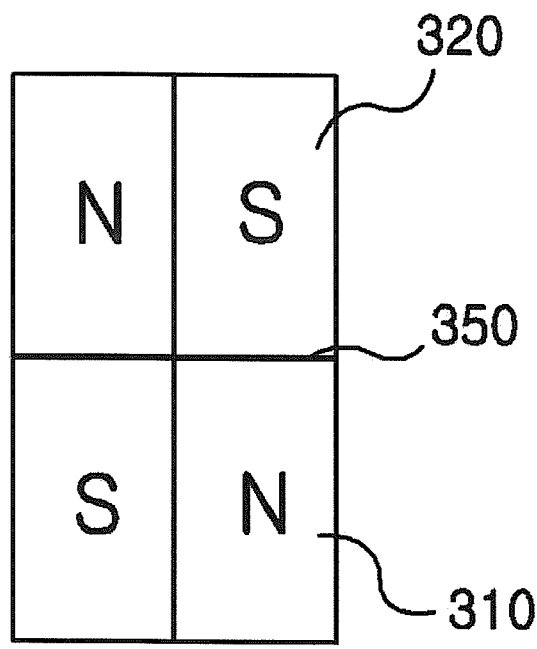

Referring to FIG. 7, the first and second magnets (310, 320) may be cross-wise arranged and be formed with an area contact unit (350) on which the first and second magnets (310, 320) are area-contacted.

Figure 8:
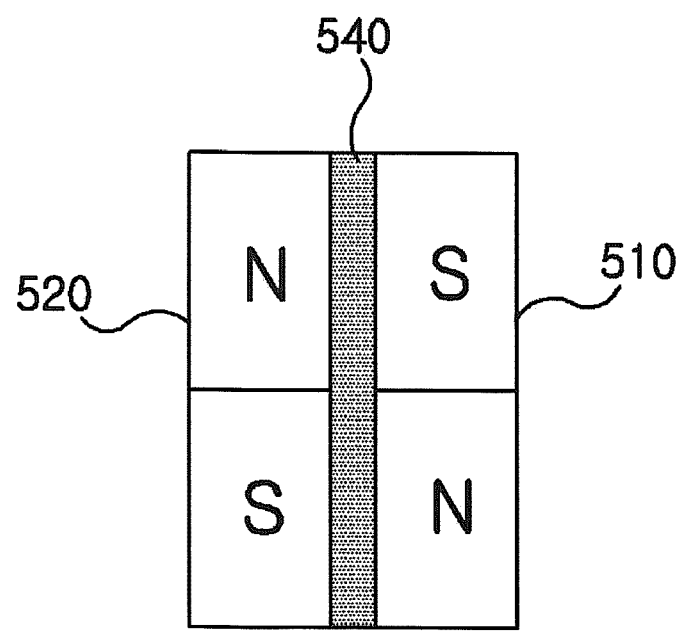

Referring to FIG. 8, the first and second magnets (510, 520) may be length-wise arranged and be formed with a non-magnetic material barrier (540) therebetween.

Figure 9:
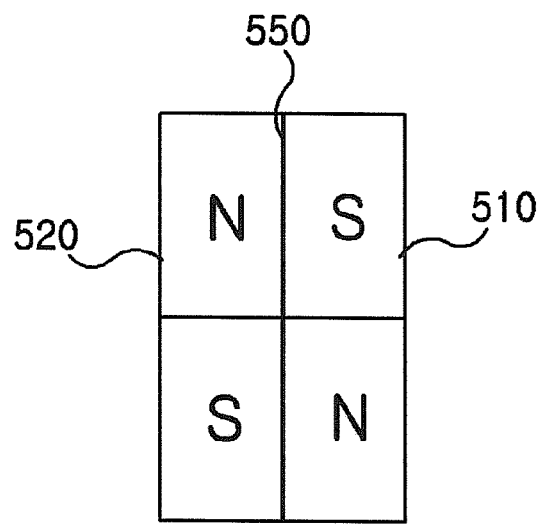

Referring to FIG. 9, the first and second magnets (510, 520) may be length-wise arranged and formed with an area contact unit (550) on which the first and second magnets (510, 520) are area-contacted.

Now, an operation status of a camera shutter device according to an exemplary embodiment of the present disclosure will be described with reference to FIGS. 10 and 11.

Figure 10:
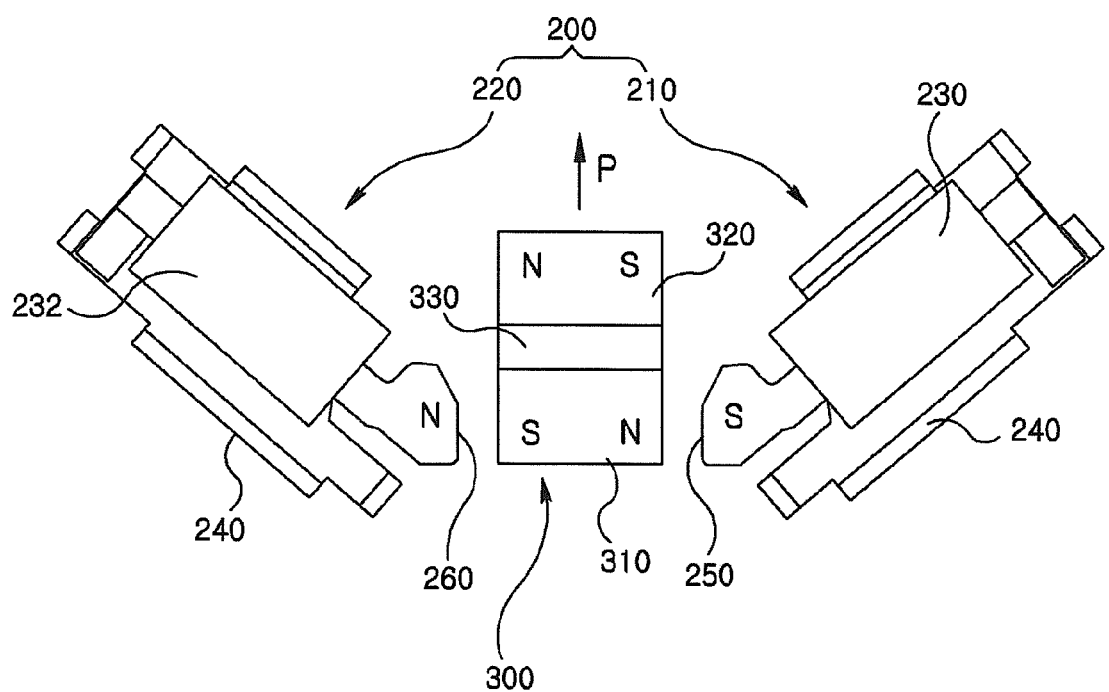
FIGS. 10 and 11 are operation status views illustrating a camera shutter device according to an exemplary embodiment of the present disclosure.
Figure 11:
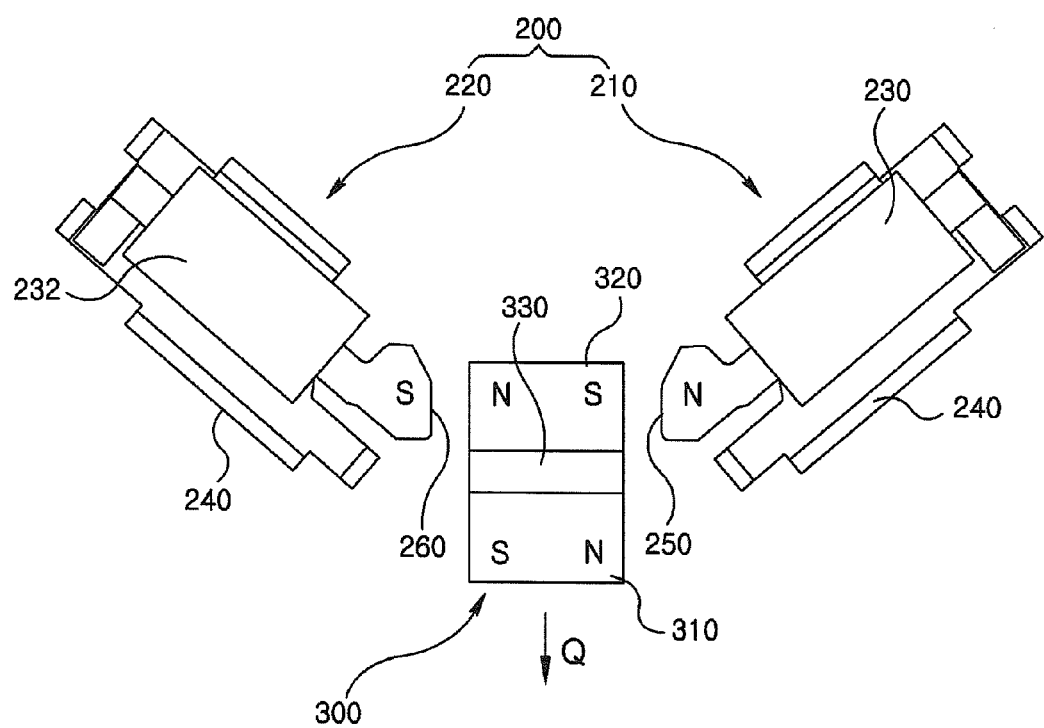

FIGS. 10 and 11 are operation status views illustrating a camera shutter device according to an exemplary embodiment of the present disclosure.

Firstly, referring to FIG. 10, if a voltage of forward direction is applied to the coil (230) of the first core (210), and a voltage of reverse direction is applied to the coil (232) of the second core (220), the electromagnetic force line generating unit (250) of the first core (210) is magnetized with S polarity, and the electromagnetic force line generating unit (260) of the second core (220) is magnetized with N polarity. Accordingly, an attractive force is applied between the electromagnetic force line generating unit (250) of the first core (210) and the first magnet (310) due to the fact that the lateral surface of the first magnet (310) facing the first core (210) is magnetized with N polarity, and a repulsive force is applied between the electromagnetic force line generating unit (250) of the first core (210) and the second magnet (320) due to the fact that the lateral surface of the second magnet (320) facing the first core (210) is magnetized with S polarity.

Similarly, an attractive force is generated between the electromagnetic force line generating unit (260) of the second core (220) and the first magnet (310), and a repulsive force is generated between the electromagnetic force line generating unit (260) of the second core (220) and the second magnet (320).

As a result, the magnet (300) moves in a direction indicated by the arrow P to open the shutter blades (110a, 110b).

Referring to FIG. 11, if a voltage of reverse direction is applied to the coil (230) of the first core (210), and a voltage of forward direction is applied to the coil (232) of the second core (220), the electromagnetic force line generating unit (250) of the first core (210) is magnetized with N polarity, and the electromagnetic force line generating unit (260) of the second core (220) is magnetized with S polarity.

Then, a repulsive force is applied between the electromagnetic force line generating unit (250) of the first core (210) and the first magnet (310) due to the fact that the lateral surface of the first magnet (310) facing the first core (210) is magnetized with N polarity, and an attractive force is applied between the electromagnetic force line generating unit (250) of the first core (210) and the second magnet (320) due to the fact that the lateral surface of the second magnet (320) facing the first core (210) is magnetized with S polarity.

Furthermore, a repulsive force is generated between the electromagnetic force line generating unit (260) of the second core (220) and the first magnet (310), and an attractive force is generated between the electromagnetic force line generating unit (260) of the second core (220) and the second magnet (320).

As a result, the magnet (300) moves in a direction indicated by the arrow Q to shut the shutter blades (110a, 110b).

INDUSTRIAL APPLICABILITY

As apparent from the foregoing, the camera shutter device according to the present disclosure has an industrial applicability in that a yoke is mounted at a core to effectively induce and block an electromagnetic force line generated when a voltage is applied to a coil, whereby an induced electromotive force can be reinforced to accurately open/shut shutter blades.

The camera shutter device according to the present disclosure has another industrial applicability in that a magnet is formed with two-pole magnetized magnets to allow a center of the pole to be positioned near to an electromagnetic force line generating unit of a core, whereby an electromagnetic force between the magnet and the core can be reinforced to increase an opening/shutting speed of shutter blades.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A camera shutter device, the device comprising:
a pair of cores, wherein each core of the pair of cores is wrapped by a coil and has a distal end facing the other, each core formed at the distal end with an electromagnetic force line generating unit;
a magnet interposed between the pair of cores, the magnet linearly and reciprocally moving in a direction perpendicular to the electromagnetic force line generating units of the pair of cores, wherein the magnet comprises a first magnet and a second magnet; and
a slider for opening and shutting a shutter blade as the magnet linearly and reciprocally moves,
wherein the first and second magnets are cross-wise arranged across the first and second cores, and are area-contacted.

2. The device of claim 1, wherein each core is mounted with a yoke for inducing and blocking an electromagnetic force line.

3. The device of claim 2, wherein the yoke takes the shape of a plate for blocking one side of the coil, and is mounted on at least one surface of the group consisting of an upper surface, a bottom surface, a left surface, and a right surface of the core.

4. The device of claim 1, wherein each core includes:
a first rod on which the core is wrapped by the coil and formed at its distal end with a first electromagnetic force line generating unit, and
a second rod connected to the first rod, arranged in parallel with the first rod and formed at its distal end with a second electromagnetic force line generating unit.

5. The device of claim 1, wherein the first and second magnets are so arranged as to have a mutually opposite polarity.

6. The device of claim 1, wherein the first and second magnets are cross-wise arranged across the first and second cores, and are formed with a gap therebetween.

7. The device of claim 1, wherein the first and second magnets are cross-wise arranged across the first and second cores, and are mounted with a non-magnetic material barrier therebetween.

8. The device of claim 1, wherein the first magnet is arranged opposite to the first core, the second magnet is arranged opposite to the second core, and a gap is provided between the first and second magnets.

9. The device of claim 1, wherein the first magnet is arranged opposite to the first core, the second magnet is arranged opposite to the second core, and a non-magnetic material barrier is between the first and second magnets.

10. The device of claim 1, wherein the first magnet is arranged opposite to the first core and the second magnet is arranged opposite to the second core.

11. An optical apparatus, the apparatus comprising:
a camera including a main body, a display unit arranged at a front surface of the main body for displaying information, and a camera shutter device provided at the main body for capturing an image or a photograph,
wherein the camera shutter device includes:
a pair of cores, wherein each core of the pair of cores is wrapped by a coil and has a distal end facing the other, each core formed at the distal end with an electromagnetic force line generating unit,
a magnet interposed between the pair of cores, the magnet linearly and reciprocally moving in a direction perpendicular to the electromagnetic force line generating unit, the magnet comprising a first magnet and a second magnet, and
a slider for opening and shutting a shutter blade as the magnet linearly and reciprocally moves,
wherein the first magnet is arranged opposite to the first core, the second magnet is arranged opposite to the second core, and the first and second magnets are area-contacted.

12. The apparatus of claim 11, wherein a core of the pair of cores is mounted with a yoke for inducing and blocking an electromagnetic force line.

13. The apparatus of claim 12, wherein the yoke takes the shape of a plate for blocking one side of the coil, and is mounted on at least one surface of the group consisting of an upper surface, a bottom surface, a left surface, and a right surface of the core.

14. The apparatus of claim 11, wherein a core of the pair of cores includes:
a first rod on which the core is wrapped by a coil and formed at its distal end with a first electromagnetic force line generating unit, and
a second rod connected to a first rod, arranged in parallel with the first rod and formed at its distal end with a second electromagnetic force line generating unit.

15. The apparatus of claim 11, wherein the first and second magnets are so arranged as to have a mutually opposite polarity.

16. The apparatus of claim 11, wherein the first and second magnets are cross-wise arranged across the first and second cores, and are provided with a gap therebetween.

17. The apparatus of claim 11, wherein the first and second magnets are cross-wise arranged across the first and second cores, and are mounted with a non-magnetic material barrier therebetween or are area-contacted.

18. The apparatus of claim 11, wherein the first magnet is arranged opposite to the first core, the second magnet is arranged opposite to the second core, and a gap is provided between the first and second magnets, or a non-magnetic material barrier is formed between the first and second magnets.

* * * * *